Oct. 5, 1965  CHOZO MURATA  3,210,082
MAGNETIC SOUND RECORDING AND REPRODUCING
APPARATUS OF THE SPIRAL SCANNING TYPE
Filed Nov. 28, 1960  9 Sheets-Sheet 1

INVENTOR.
CHOZO MURATA
BY
ATTORNEYS

Oct. 5, 1965  CHOZO MURATA  3,210,082
MAGNETIC SOUND RECORDING AND REPRODUCING
APPARATUS OF THE SPIRAL SCANNING TYPE
Filed Nov. 28, 1960  9 Sheets-Sheet 2

INVENTOR.
CHOZO MURATA
BY
ATTORNEYS

INVENTOR.
CHOZO MURATA

Oct. 5, 1965 CHOZO MURATA 3,210,082
MAGNETIC SOUND RECORDING AND REPRODUCING
APPARATUS OF THE SPIRAL SCANNING TYPE
Filed Nov. 28, 1960 9 Sheets-Sheet 5

INVENTOR.
CHOZO MURATA
BY
ATTORNEYS

INVENTOR.
CHOZO MURATA
BY
Wenderoth, Lind & Ponack
ATTORNEYS

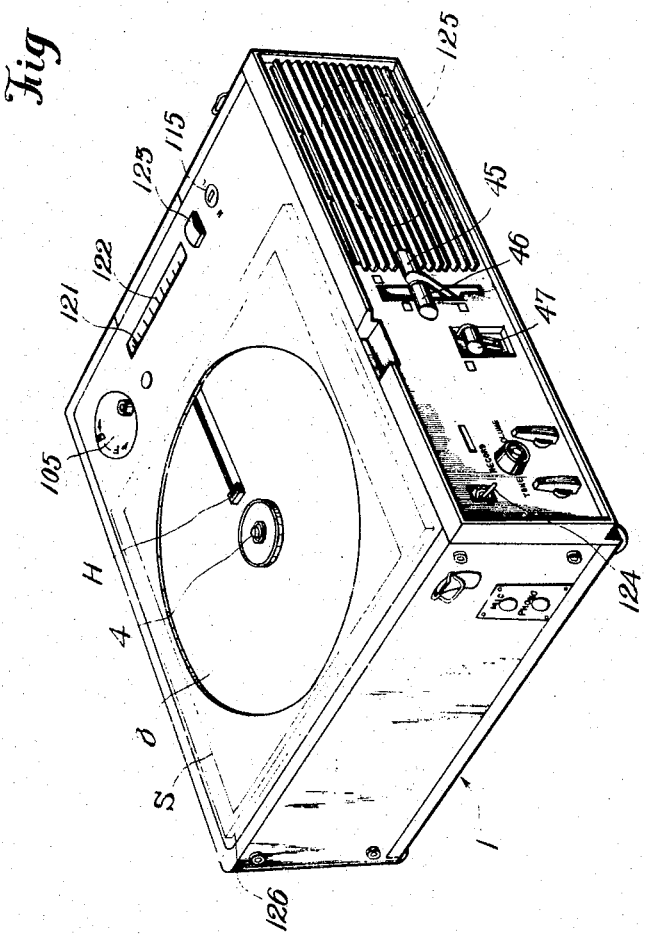

United States Patent Office 3,210,082
Patented Oct. 5, 1965

3,210,082
MAGNETIC SOUND RECORDING AND REPRO-
DUCING APPARATUS OF THE SPIRAL SCAN-
NING TYPE
Chozo Murata, Tokyo, Japan, assignor to Canon Camera
Company, Inc., Tokyo, Japan, a corporation
Filed Nov. 28, 1960, Ser. No. 72,190
Claims priority, application Japan, Dec. 1, 1959,
34/37,693
7 Claims. (Cl. 274—4)

This invention relates to a novel and useful magnetic recording and reproducing apparatus comprising magnetic sound recording and reproducing heads which are given a spiral scanning movement by means of cam plates.

A distinct object of this invention is a spiral scanning type magnetic recording and reproducing apparatus provided with a cam plate which gives a spiral movement to a sound recording and reproducing head.

Another distinct object of the invention is to provide a magnetic recording and reproducing apparatus in which a sound recording and reproducing head operates certainly and simply.

This invention is characterized in that it comprises a turntable including a relatively rotatable cam plate thereon, a sound recording and reproducing head supported by and rotating with said turntable and a new mechanism that causes the turntable to rotate and simultaneously rotates said cam plate with a proper rotational speed difference, and said head being given a positive spiral movement by means of a cam plate.

It is further characterized in that the sound recording and reproducing head of this invention can be reset simply and smoothly to its original position without any special and complicated mechanisms.

It is further characterized in that because of the use of the cam plate one can easily choose any starting position for the sound recording and reproducing head, according to the area of magnetic coating of recording sheets.

The invention is further characterized in that, by providing the cam plate, means for causing the spiral movement, can be easily assembled and adjusted, and this is an important advantage in the production.

This invention will be more fully understood and the foregoing and further objects thereof will appear from the following description read in conjunction with the drawings in which:

FIG. 14 is a perspective view of a magnetic sound recording and reproducing apparatus of the present invention.

Figure 1:
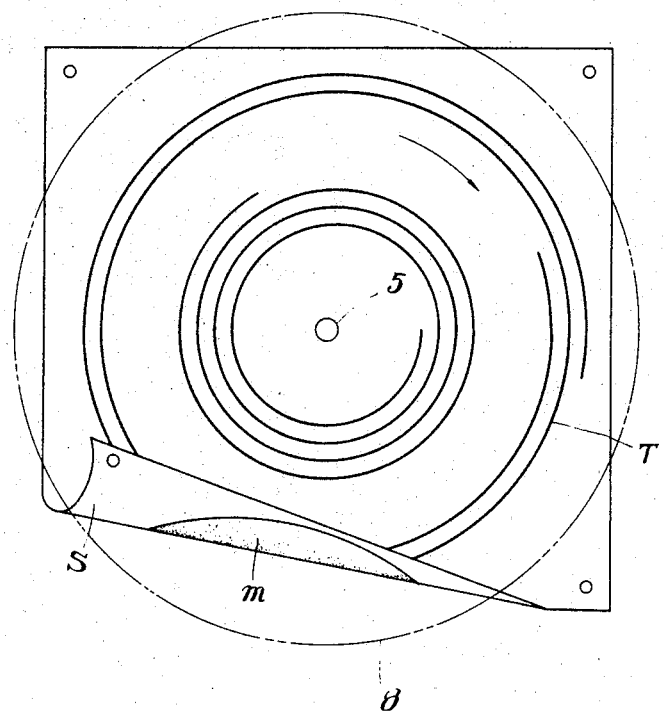
FIG. 1 is a plan view of a sound recording sheet, a part of which is turned over.

Referring to the drawings, in FIG. 14, 1 indicates a cabinet having an upper panel 2 having a circular aperture 3 the radius of which is a little greater than the maximum radius of spiral movement of a head H, and a record sheet S (FIG. 1) is placed on panel 2 (FIG. 5), a centering aperture 5 of record sheet S fits over a pin 4 projecting from a central portion of an axle set in the center of aperture 3. A turntable 8 is horizontally rotatably mounted by means of a boss $8_1$ thereof on a fixed axle 7 (FIGS. 5 and 8) united to a plate 6 in cabinet 1. When a drive is transmitted from motor M shown in FIG. 2 to a cone wheel 10, to an idler wheel 11, to a fly wheel 12, to a spindle 13, to a friction driving wheel in the form of a capstan 14, to a drive clutch wheel 15, and is transmitted to a flange $8_3$ of turntable 8, it gives a normal rotation to turntable 8 in the direction as shown by an arrow $a$ in FIG. 8.

Figure 8:
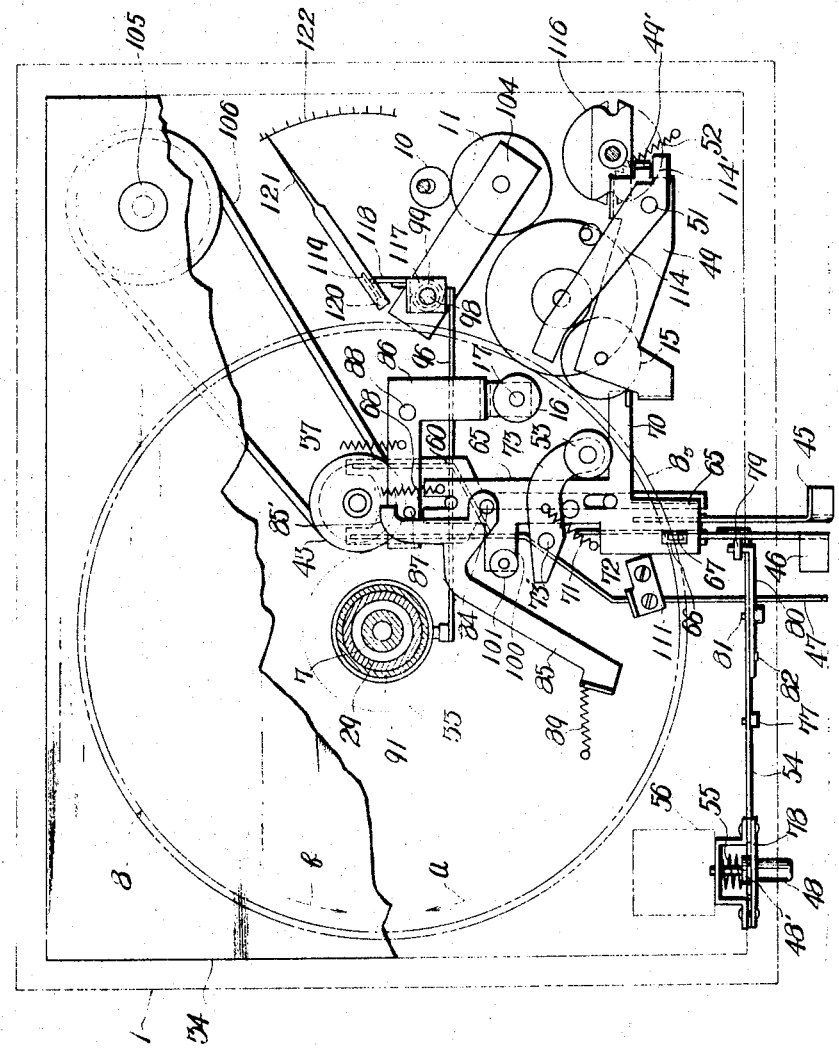
FIG. 8 is a part sectional plan view of FIG. 2, the lower part being taken on line VIII—VIII thereof.
Figure 10:
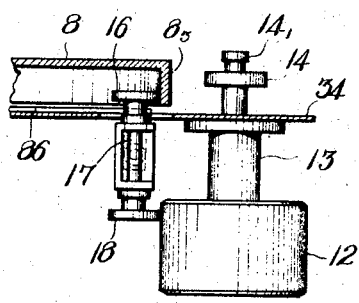
FIG. 10 is a side view of a transmission mechanism set in the reverse rotation condition.
Figure 11:
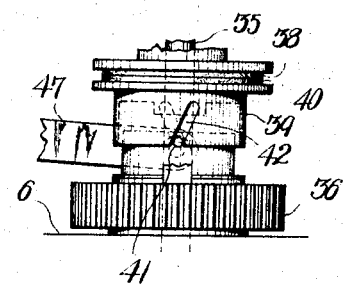
FIG. 11 is a front view of a track adjusting mechanism of this invention.

When drive clutch wheel 15 moves back away from and disengages from flange $8_3$ and capstan 14, a reversing clutch means is actuated which has a friction wheel 16 which moves forward engaging the interior surface of flange $8_3$, a friction wheel 18 on a same shaft with friction wheel 16 as shown in FIG. 10 which engages fly wheel 12, and turntable 8 turns in a direction opposite to the $b$ direction as in FIG. 8.

Figure 5:
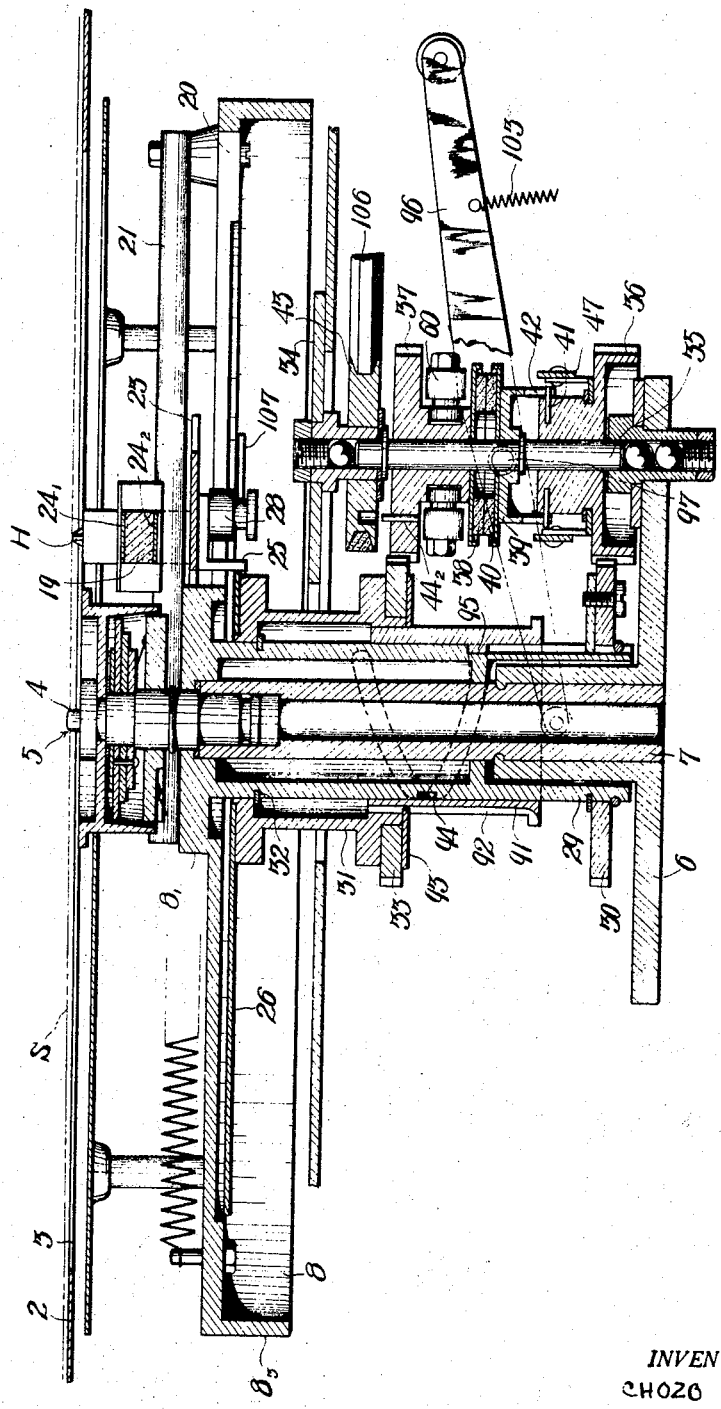
FIG. 5 is an enlarged sectional view of the central portion of FIG. 2.
Figure 6:
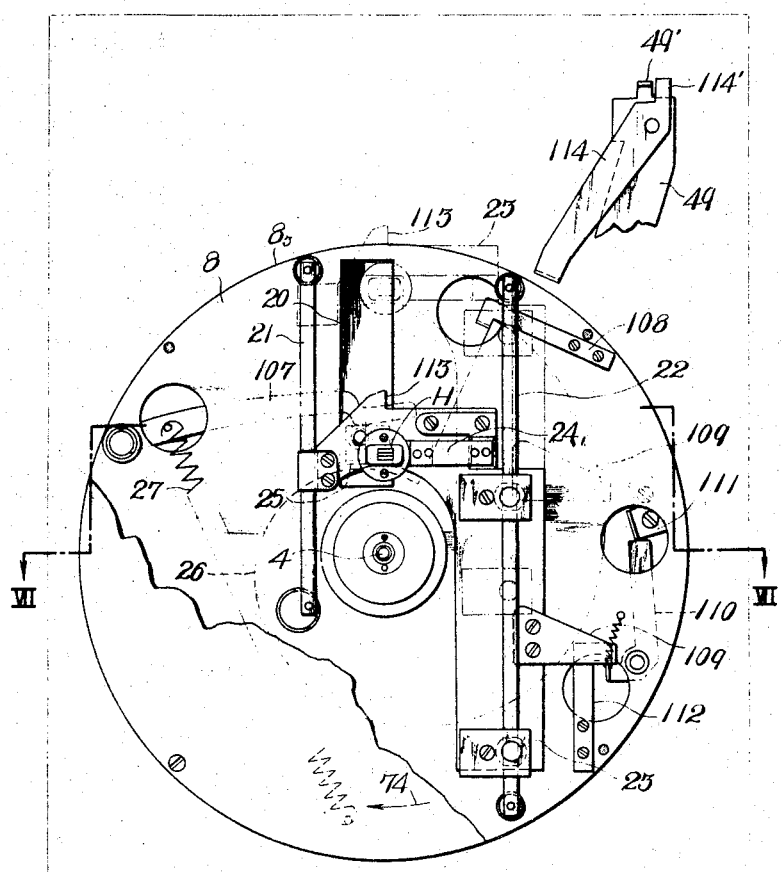
FIG. 6 is a plan view of a turntable, partly broken away, showing its operation.
Figure 7:
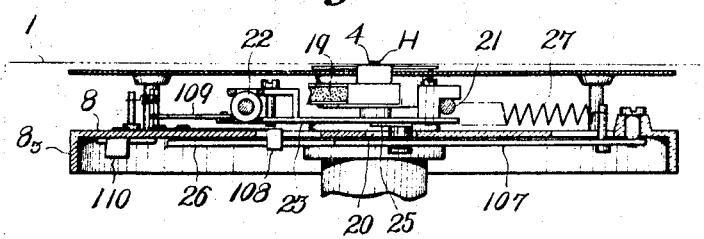
FIG. 7 is a cross-sectional view of FIG. 6, taken on line VII—VII thereof.

As shown in FIG. 6, turntable 8 has a radial aperture 20 in which head H moves and a pair of guide bars 21 and 22 thereon parallel to the elongated aperture. One end of spring plates $24_1$, $24_2$ (in FIGS. 5 and 6), a pair of spring plates, one upper and the other lower, is fixed to a movable plate 23 horizontally mounted between guide bars 21 and 22, head H is mounted on free ends of spring plates $24_1$ and $24_2$, and a sponge 19 is mounted between the spring plates to lessen shocks on head H. A projection 25 is mounted on plate 23 and abuts turntable 8 under the head mounting position thereof, projecting under turntable 8 through elongated aperture 20, a cam plate 26 is provided on the lower part of turntable 8, and projection 25 is always engaged with cam plate 26 under the action of a push lever 107 and a spring 27 pulling push lever 107 against pin 28 on plate 23.

As illustrated in FIG. 5, boss $8_1$ of turntable 8 extends downwardly in the form of a hollow rotating shaft 29 and has a gear 30 fixed thereto. A tubular shaft 31 is loosely fitted on hollow rotating shaft 29, and is supported thereon by a support 32, and a gear 33 and said cam plate 26 are fixed to said tubular shaft 31. Gears 30 and 33 have a different number of teeth, for instance, one gear has one more tooth than the other. A clutch shaft 35 is vertically provided between plate 6 and an upper frame base 34, gears 36 and 37 which have the same number of teeth are rotatably mounted on shaft 35 and engage gears 30 and 33. A clutch plate 38 is located between gears 36 and 37 and is connected to gear 37 and a clutch plate 40 fixed to a cup-shaped member 39 is connected to gear 36 by pins 41 extending through diagonal grooves 42 in cup-shaped member 39. A pulley 43 is rotatably mounted on clutch shaft 35 is coupled to gear 37 provided by clutch pins $44_2$.

Figure 3:
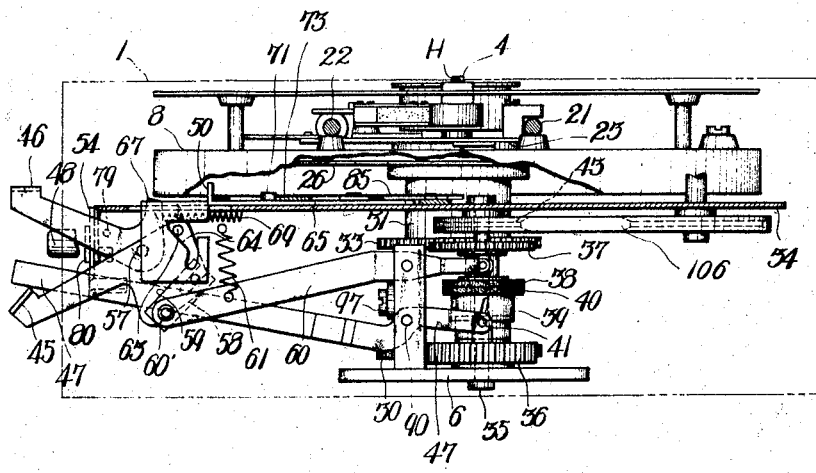
FIG. 3 is a side view of the elemental structure shown in FIG. 2, a part of which is omitted.

The apparatus has a starting handle 45 and a handle 46 for instant stop and also for reversing. Said handles 45 and 46 are placed on the front side of cabinet 1 as shown in FIGS. 3 and 8, and, when both handles are set as in FIG. 4, drive clutch wheel 15 disengages from capstan 14 and flange $8_3$, a braking means 53 contacts turntable 8, and turntable 8 and cam plate 26 become stationary.

Figure 2:
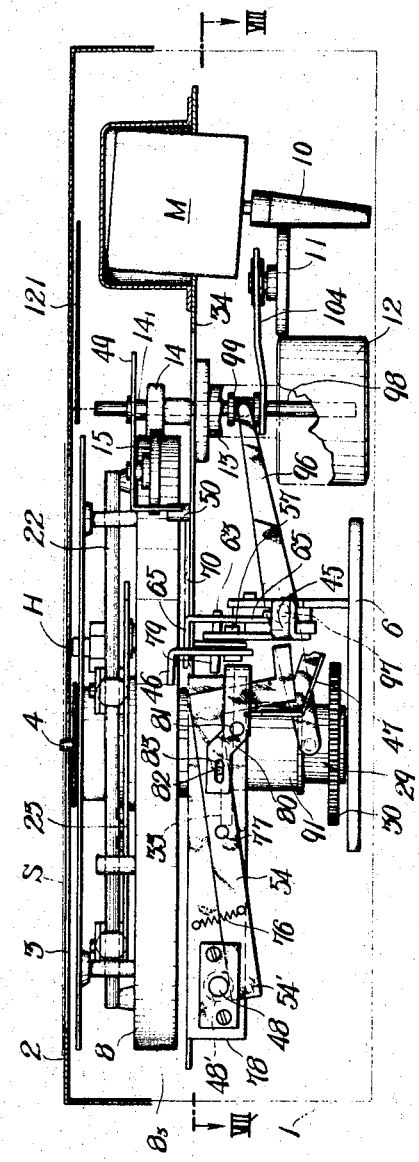
FIG. 2 is a front broken away view of a magnetic sound recording and reproducing device of this invention showing the main part of its interior mechanism.
Figure 4:
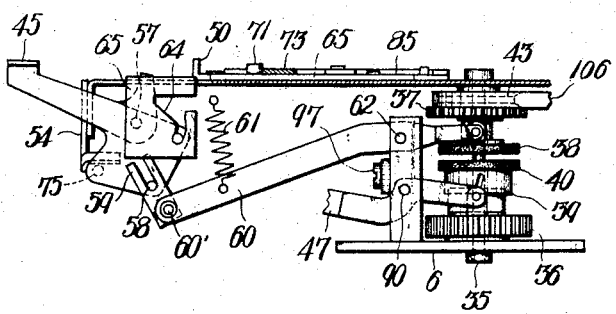
FIG. 4 is a view similar to FIG. 3 showing the operation of a part of the structure of FIG. 3.

When motor M rotates, the energy is transmitted from the cone wheel 10 to capstan 14 as in FIG. 2 and FIG. 8. Then, as starting handle 45 in a position as in FIG. 4 is pushed down, it turns on pivot member 57, and turns a fork lever 59 interlocked with a pin 58, downward then up to the position illustrated in FIG. 3. Clutch controlling lever 60 connected with fork lever 59 by a pin 60' rotates clockwise on a shaft 62 under the action of a spring 61, disengages clutches pin $44_2$ and engages clutch plate 38 with clutch plate 40. A shiftable plate 65 restrained by an engagement of a cam groove 64 with a pin 63 in the rear end of starting handle 45 is moved to right in FIG. 3 pulled by a spring 68, and a hook 50 of an arm 70 extending laterally of shiftable plate 65 as in FIG. 8 releases the pressure on clutch wheel lever 49. Said lever 49 rotates clockwise under the action of spring 52, moves drive clutch wheel 15 forward and engages it with capstan 14 and flange $8_3$. As pin 71 on shiftable plate 65 moves backward, it pivots a brake shoe lever B counterclockwise (FIG. 8) against the action of spring 72, about a shaft 73' and braking means in the form of a brake shoe 53 moves away from flange 83. Accordingly turntable 8 rotates in the direction as illustrated by an arrow $a$ in FIG. 8 carrying head H.

Figure 13:
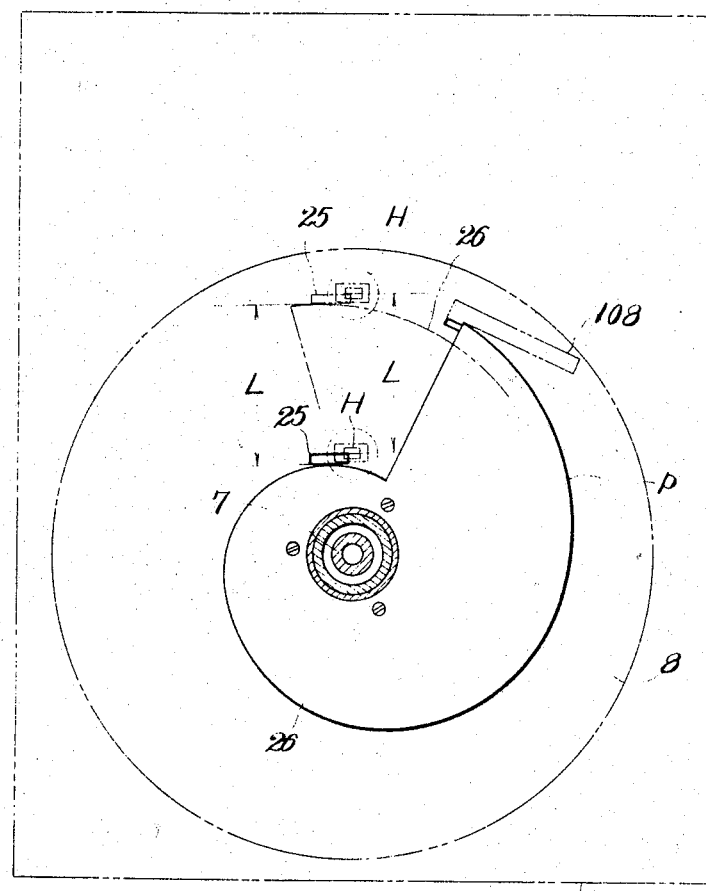
FIG. 13 is a plan view of a cam plate.

During the rotation of turntable 8, hollow shaft 29, gears 30 and 36, pins 41, diagonal groove 42 in cup-shaped member 39, clutch plates 40 and 38, gear 37 and 33 and hollow shaft 31 rotate and thereby cam plate 26 rotates in the direction of arrow 74 illustrated in FIG. 6. The relation of gears 30, 31, 32 and 33 is as follows: If the number of teeth on gear 30 is $n$ and that on gear 33 is $n-2$, for instance, and the number of teeth on gears 36 and 37 are the same, gear 33 rotates through one rotation and then two teeth more when gear 30 rotates once completely. If, for instance, spiral track T includes 56 rotations, and gear 30 has 128 teeth and gear 33 126 teeth, gear 33 is advanced about 320 degrees when gear 30 rotates fifty-six (56) times. Thus cam plate 26 is so constructed as to rotate 320 degrees during the total number of rotations of turntable 8. As illustrated in FIG. 13, cam plate 26 has a cam surface P, the rotational extension and radius of which are proportioned, and lift L thereof has the same value as the radial stroke of head H.

According to the construction as described above, when turntable 8 rotates in the direction of an arrow $a$ from the starting point of head H at the interior end of the scanning track T, in the position as in FIG. 5, said head H rotates with turntable 8. Moreover, said head H is gradually urged outwardly by cam plate 26 rotating with said head and being rotationally advanced little by little, moves radially, and traces a spiral track T as shown in FIG. 1. If the member of teeth on gear 30 and 33 and the shape of cam surface P are constructed as above mentioned, head H finishes scanning after fifty-six rotations of the turntable and, during the rotations gear 33 and cam plate 26 are advanced about 320 degrees and are ready for resetting of head H. The above mentioned gear mechanism should be so constructed that the rotation of cam plate 26 is delayed when turntable 8 rotates in reverse.

When using the recording apparatus it often becomes necessary to reproduce a part of statements made during recording, or to stop the sound instantly or to re-reproduce a certain part again and again during reproduction. It is not effective to stop or to reverse motor M at the required time. According to the present invention, when handle 46 at a position as in FIG. 3 is pushed down one step, shiftable plate 65 engaging with projection 67 of handle 46 is pulled (in FIG. 8), hook 50 pulls clutch wheel lever 49 back and drive clutch wheel 15 is disengaged from capstan 14 and flange $8_3$. Further, braking shoe lever 73 is moved clockwise (FIG. 8) by spring 72 against pin 71 on the surface of shiftable plate 65 and damping means 53 engages turntable 8 to stop the rotation so that turntable 8 stops while motor M is still working.

Next, when handle 46 is pushed down one more step, shiftable table 65 is drawn back even more, a pressure device 101 on a branch arm 100 on shiftable plate 65 presses against the rear side of brake shoe lever 73 and pivots arm 73 to release the braking means 53. Then, a hook 85' on a lever 85, the fulcrum of which is on shiftable plate 65, is moved along with shiftable plate 65, engaging and pulling back a pin 87 on a reverse clutch lever 36 of wheel 16 which is for reverse rotation of turntable 8. Then reverse clutch lever 86 turns counterclockwise about a fulcrum 88 as its center, and friction wheel 16 at one end thereof slippingly engages with flange $8_3$. At this time, a friction wheel 18 on axle 17 with the friction wheel 16 engages fly wheel 12 as shown in FIG. 10, and turntable 8 and, as distinguished from the case of the drive through capstan 14 for normal rotation, it is directly controlled by fly wheel 12 having a large diameter, so that turntable 8 rotates very rapidly in the reverse direction.

Magnetic sound recording and reproducing apparatus using sound recording sheets is superior to recording apparatus using magnetic tape in that rapid feeding, resetting, reproduction repetition, listening here and there, rapid return to the starting point, etc. can be carried out very smoothly. When the abovementioned functions are desired in magnetic recording and reproducing apparatus comprising a head which is given a spiral movement by means of turntable and cam plate, both of them rotating together with a small differential rotation as described above, it is necessary for this system to have additional mechanisms, such as for intermittent driving from motor M to turntable 8 through drive clutch wheel 15, braking by braking means 53, for changing to reverse rotation by friction wheel 16, and for engagement and disengagement of cam plate 26 and turntable 8, which sets cam plate 26 free and makes it possible to feed rapidly, to reset, to return to the starting point, and one of characteristics of the present invention is in that these complex operations are carried out by only two handles 45 and 46. As described above in more detail, release of starting handle 45 causes transmitting of energy to the turntable, and simultaneously engages the interlocking mechanism between the cam plate and the turntable, and then the scanning begins. The first step of operation of handle 46 for instant stop and reverse turn stops the abovementioned transmission of energy and stops the device by operating a braking means, and the second step of operation releases the damping means and brings the reverse rotating means into operation. The operation is very simple and there is no danger of mishandling, so that the operation of the magnetic sound recording and reproducing apparatus of abovementioned type is thus made very easy.

The difference between the position of head H relative to the recording track is adjusted by rotating handle 47 (FIGS. 3 and 8) about a fulcrum 90 as a center, changing the position of pin 41 in diagonal groove 42 to cause up and down movement of gear 36 on the end of handle 47 and advancing or retarding the cam 26 through cup-shaped member 39 clutch plates 38 and 40 and gears 37 and 33 from the rotating gear 36 driven from turntable 8.

Figure 12:
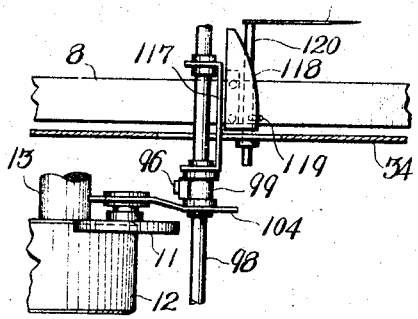
FIG. 12 is a side view of a scanning position indicator thereof.

Further, if the rotation speed of turntable 8 is constant, the linear speed of the head must be changed at the inside and the outside of the spiral groove to accommodate the differences of recording time per unit of length. To make the linear speed of the head constant, a loosely fitted tube 91 is inserted between hollow shafts 29 and 31 (FIG. 5), rotating with hollow shaft 31 and being slidable in the axial direction by means of key groove means 92 and 93. Said loosely fitted tube 91 is engaged with hollow shaft 29 by means of a helical groove 94 and a pin 95 which can rise gradually along the helical groove 94 during the normal rotation of turntable 8 as shafts 29 and 31 rotate at their slightly different speeds. During this rise, lever 96 which is connected at one end to shaft 91 pivots around fulcrum 97 as a center under the action of a spring 103 so that the other end of lever 96 gradually moves a ring 99 loosely fitted on guide rod 98 (FIGS. 2 and 12). The idler wheel 11 is mounted on guide rod 98 by means of a fixed arm 104 and bears against both cone wheel 10 and fly wheel 12 and gradually descends along cone wheel 10 and toward the small end thereof, so that the rotational speed of the turntable is gradually decreased in accordance with the inward movement of head H, and it is possible to make the linear speed constant by providing the proper shape for cone wheel 10. This shape can be one of two shapes, either the cone wheel 10 can be a hyperbolic cone, or it can be a circular cone having a helical groove therein with a hyperbolic lead.

The starting point adjustment is a most important feature of the invention by which head H and cam plate 26 can be returned rapidly to the starting point at the central portion of the spiral scanning line after the scanning is completed, and the head will always stop at the same starting position.

As seen in FIGS. 4 and 8, when starting handle 45 is not acting, clutch plate 38 is moved by lever 60 so as to be disengaged from corresponding clutch palte 40 and, on the contrary, clutch pin 44$_2$ is engaged in pulley (as in FIG. 5), if a knob 105 is rotated manually and rotates cam plate 26 in the reverse direction through movement of a belt 106, pulley 43, gears 37 and 33 and hollow shaft 31, cam plate 26 returns to its original position and head H is reset to its starting position by the movement of the cam plate. It is possible for the abovementioned mechanism to be operated automatically. Hollow shaft 91 descends during reverse rotation of tubular shaft 31, so that lever 96 swings and restores idler wheel 11 to its original position as shown in FIG. 2. When the one end of cam plate 26 engages a stop pin 108 mounted on turntable 8 at the end of the reverse movement of cam plate 26, which position of engagement is the regular starting position, turntable 8 thereafter rotates with the cam plate. During these operations, movable plate 23 supporting the head H also returns along the guide bars 21 and 22, a stop pin 109 on plate 23 strikes a stop pin 110 mounted on turntable 8 and turns it counterclockwise. Further, when turntable 8 rotates with the cam plate, said stop pin 110 strikes a stop pin 111 mounted on the upper frame base 34 so that the turntable and cam plate are stopped. That is, the position where stop pin 110 engages with stop pin 109, is the starting position of head H on cam plate 26, and the position where stop pin 110 engages with stop pin 111 is the starting position of the turntable and cam plate. Moreover, when the scanning is over, an engaging device 113 mounted on movable plate 23 projects as shown by a broken line in FIG. 6, and strikes a lever 114 and causes it to turn counterclock, the rear end 114′ thereof pressing against a projection 49′ on clutch wheel lever 49 as illustrated in FIG. 6. Drive clutch wheel 115 is thereby disengaged from capstan 14 and flange 8$_3$, and the drive is cut off so that turntable 8 stops automatically.

Figure 9:
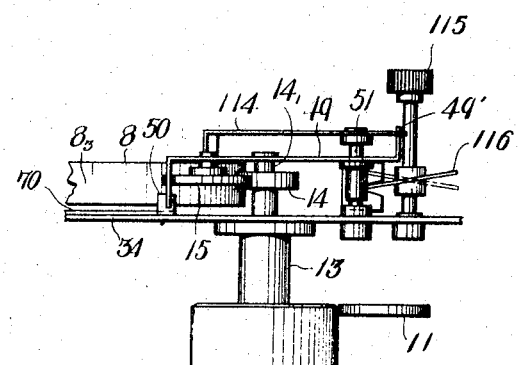
FIG. 9 is a side view of a speed changing mechanism of this invention.

The scanning speed is set by means of an inclined circular plate 116 which is turned by the rotation of a knob 115 (FIG. 9), and which moves clutch wheel lever 49 carrying driving clutch wheel 15 up and down along a supporting shaft 51 so that drive clutch wheel 15 engages capstan 14 with a large diameter or capstan 14′ with a small diameter.

FIG. 12 shows the mechanism for indicating the scanning position. A cam 118, mounted on a bracket 117 attached to the ring 99 on shaft 98, bears against a needle 121 on a shaft 120 and rotates it so that the scanning position or the number of spirals scanned is indicated on a graduated plate 122 (FIG. 8). Accordingly, when the starting lever is in the position shown in FIG. 4, a starting point can be selected and decided very smoothly by rotating handle 105, rotating the cam and setting the needle 121 on the graduated plate 122.

The reproducing circuit is changed to a recording circuit by a switch 56 when a push button 48 shown in FIGS. 2 and 8 is pushed. A safety member 54 is freely movably mounted between a flange 48′ on push button 48 and plate 78, and one end of the safety member is pressed up and is prevented from operating by a pin 75 (FIG. 4) mounted on starting handle 45 when the scanning is stopped. When push button 48 is pushed in, it is pushed back out by spring 55 and doesn't remain pushed in. When starting handle 45 is pushed down, safety member 54 is swung by the spring 76 to a position such that it is ready to operate. Pin 79 (FIG. 3), which is mounted on handle 46 and is pushed down when handle 46 is pushed down for reverse operation, swings a supplemental lever 80, shown in FIGS. 2 and 3, clockwise in FIG. 2, and safety member 54 is then released so that it is outside the sphere of operation, push button 48 is reset and the recording circuit is automatically cut off. This is a safety device preventing damage of the record due to bias voltage inflicting on the head by a careless mistake by leaving the device in the recording condition. In FIG. 14, 123 is a level meter, 124 a switch for an electric power source, 125 a speaker, and 126 a holding plate, respectively.

The principles of the invention explained in connection with specific exemplifications thereof will suggest to those skilled in the art many other applications and modifications of the same. It is accordingly desired that the appended claims be construed broadly, and that they shall not be limited to the specific details shown and described in connection with examplifications thereof.

I claim:

1. A magnetic sound recording and reproducing apparatus comprising means for holding a magnetic disc in a fixed position, a turntable beneath said holding means, drive means for rotating said turntable, driving clutch means coupled between said drive means and said turntable, reversing clutch means coupled between said drive means and said turntable for driving said turntable in reverse, a magnetic head mounted on said turntable for movement radially of said turntable and across the magnetic disc, a cam plate mounted for rotation about the same axis as said turntable, said cam having a spiral edge engaged with said magnetic head, further clutch means coupled between said turntable and said cam plate for rotating said cam with said turntable and relative to said turntable through only a fraction of a revolution for each revolution of said turntable, brake means engageable with said turntable, and control means for engaging and disengaging said clutch means, said brake means and said reversing clutch means in a preset sequence so that it is possible to reproduce during recording a portion of the material previously recorded.

2. A magnetic sound recording and reproducing apparatus as claimed in claim 1 in which said control means comprise a starting handle coupled to said braking means and to said clutch means for releasing said braking means and simultaneously engaging said clutch means, and a stopping and reversing handle mounted on said apparatus for movement in two stages and coupled to said clutch means, said brake means and said reversing clutch means for disengaging said clutch means and engaging said brake means upon movement to said first stage, and for releasing said brake means and engaging said reversing clutch means upon movement to the second stage.

3. A magnetic sound recording and reproducing apparatus as claimed in claim 2 in which said drive clutch means comprises a friction driving wheel driven from said drive means, a clutch wheel, a clutch wheel lever on which said clutch wheel is mounted, said lever being pivotable between positions in which said clutch wheel is engaged with said drive wheel and said turntable and in which said clutch wheel is disengaged from both said drive wheel and said turntable, said brake means comprises a brake shoe, a brake shoe lever on which said brake shoe is mounted, said brake shoe lever being pivotally mounted on said apparatus for movement between a position in which said brake shoe is engaged with said turntable and a position in which said brake shoe is out of engagement with said turntable, said reversing clutch means comprises a friction wheel, a reverse clutch lever on which said friction wheel is mounted, said reverse clutch lever being pivotable between a position in which said reverse clutch wheel is in engagement with said turntable and said drive means, and said stopping and reversing means comprises a slide engageable with each of said levers for moving said clutch wheel lever to pivot it to move said clutch wheel out of engagement with said drive wheel and turntable and to pivot said brake shoe lever to move the brake shoe into engagement with said turntable upon movement to said first stage, and said slide is engageable with said brake shoe lever and said reverse clutch lever for moving said brake shoe lever to pivot the brake shoe out of engagement with said turntable and to pivot said reverse clutch lever to move said friction wheel on said reverse clutch lever into engagement with said drive means and said turntable.

4. A magnetic sound recording and reproducing apparatus as claimed in claim 1 in which said further clutch means said control means therefor comprise a first gear driven from said turntable, a second gear geared to said cam plate, said second gear and said cam plate having a smaller gear ratio than said turntable and said first gear, said first and second gears being mounted for rotation about a common axis and having clutch members thereon engageable and disengageable from each other, and said control means comprising a lever means engaged with one of said gears for moving said gear relative to the other of said gears for engaging said clutch members.

5. A magnetic sound recording and reproducing apparatus as claimed in claim 4 in which adjusting means is coupled to said further clutch means, said adjusting means comprising a wheel being engageable with said second gear wheel, and manual rotating means connected to said wheel for manually rotating said wheel, said lever means being connected to said second gear and moving the clutch member thereon out of engagement with the clutch member on said first gear and into engagement with said wheel, whereby said cam plate can be disengaged from said turntable and rotated manually for resetting said head in said turntable.

6. A magnetic sound recording and reproducing apparatus as claimed in claim 1 in which said drive means and driving clutch means are adjustably coupled for enabling said drive means to drive said driving clutch means at varying speeds, and means coupled between said cam plate and said driving means and driving clutch means for varying the speed of the drive of said driving clutch means depending on the position of said cam plate.

7. A magnetic sound recording and reproducing apparatus as claimed in claim 1 and cam plate stop means on said turntable engageable with said cam plate for stopping said cam plate at the starting position for the cam plate movement, magnetic head stop means on said turntable for stopping said magnetic head in the proper starting position, turntable stop means on said magnetic head, and driving clutch disengaging means engageable by said turntable stop means when said magnetic head reaches the outermost position on the turntable and coupled to said driving clutch means for disengaging said driving clutch means when it is engaged by said turntable stop means.

References Cited by the Examiner

UNITED STATES PATENTS

| | | | |
|---|---|---|---|
| 2,486,662 | 11/49 | Leitner | 274—9 |
| 2,562,665 | 7/51 | Grimm | 274—13.1 |
| 2,647,752 | 8/53 | Barker | 274—20 |

NORTON ANSHER, *Primary Examiner.*

STEPHEN W. CAPELLI, *Examiner.*